United States Patent
Chabek

[15] 3,652,104
[45] Mar. 28, 1972

[54] INDEPENDENT WHEEL SUSPENSION FOR VEHICLES

[72] Inventor: Kurt Herwig Chabek, Munchingen-Kallenberg, Germany

[73] Assignee: Firma Dr.-Ing. Porsche, h.c.F.K.G., Stuttgart-Zuffenhausen, Germany

[22] Filed: Jan. 20, 1970

[21] Appl. No.: 4,235

[30] Foreign Application Priority Data

Feb. 12, 1969 Germany.................P 19 06 864.5

[52] U.S. Cl. .................................................. 280/96.2 R
[51] Int. Cl. ............................................................ B60g 3/26
[58] Field of Search .................. 280/96.2, 124 B; 267/20 A, 267/57, 21, 22

[56] References Cited

UNITED STATES PATENTS 2,113,382  5/1938  Oppenheimer .......................... 267/20
2,199,063  5/1940  Balz ........................................ 267/20
2,536,769  1/1951  Rix et al. ............................ 267/20 UX
3,497,233  2/1970  Bolaski .................................. 280/96.2

FOREIGN PATENTS OR APPLICATIONS 807,755  7/1951  Germany ............................. 280/96.2

Primary Examiner—Kenneth H. Betts
Attorney—Craig, Antonelli & Hill

[57] ABSTRACT

An independent wheel suspension for vehicles wherein the vehicle wheel is guided by means of upper and lower transverse wheel forks mounted at the vehicle frame so as to be pivotable about at least approximately horizontal axes. The lower transverse wheel fork is connected directly to the vehicle frame, while the upper transverse wheel fork is connected to the vehicle frame by means of a two-armed deflecting guide member. A torsion bar can be arranged in the longitudinal direction of the vehicle for wheel springing and can be disposed in the extension of the frame-side pivot axis of the lower transverse wheel fork.

31 Claims, 3 Drawing Figures

PATENTED MAR 28 1972　　　　　　　　　　3,652,104

Inventor:
KURT HERWIG CHABEK

By Craig, Antonelli, Stewart & Hill
Attorneys 3,652,104

INDEPENDENT WHEEL SUSPENSION FOR VEHICLES

BACKGROUND OF THE INVENTION

The present invention relates to an independent wheel suspension for vehicles, and more particularly, to an independent wheel suspension wherein the wheel is guided by means of an upper and a lower transverse or lateral wheel fork, and wherein both transverse wheel forks are mounted at the vehicle frame so that they are pivotable about at least approximately horizontal axes.

In addition to the interfering forces effective upon the vehicle from the outside, the changes in track and camber of the wheels during springing, caused by the kinematics of the wheel suspension, exert considerable influence on the lateral stability of a vehicle. While changes in camber in the positive direction actually cause a reduction of the lateral guide forces of the tires, changes in the track first cause a squeezing of the tires, and then a lateral sliding of the tires. However, laterally sliding tires cannot any more produce sufficient lateral guide forces. Therefore, independent wheel suspensions of the aforementioned type must be constructed so that, during springing, only quite minor changes in track and camber result. In order to attain this objective transverse wheel forks having differing effective lengths are employed in conventional independent wheel suspensions. Often, differing wheel fork positions are employed by varying spacings of the hinged mounting points of the wheel forks at the vehicle frame and at the wheel carrier additionally in combination with differing wheel fork lengths. By means of this measure, which is described in the "Journal of Automotive Technology," 1967, Vol. 4, it is possible to maintain very small changes in track and camber over a certain section of the entire wheel stroke. Beyond this section, however, the track and camber changes which occur become very large, so that even a combination of the conventional measures does not result in a satisfactory track and camber characteristic over the entire wheel stroke.

SUMMARY OF THE INVENTION

It is an underlying aim of the present invention to overcome the aforementioned problems by providing an independent wheel suspension of the above-described type for automotive vehicles, wherein the camber characteristic can be influenced over the entire wheel stroke without changing the camber in the normal position.

It is one of the objects of the present invention to improve the lateral stability of vehicles having wheels suspended independently of one another by means of transverse wheel forks.

The underlying problems are solved in accordance with the present invention by connecting the lower transverse wheel fork directly, and the upper transverse wheel fork by the interposition of a two-armed deflecting guide member, to the vehicle frame. The free arm of the guide member is pivotably joined to an extension of the lower transverse wheel fork, which extension extends beyond the mounting point at the frame by means of a link or hinge rod. In this connection, the lever arms of the deflecting guide member are designed to be of equal length and are disposed at an angle with respect to each other. If the lever arms of the deflecting guide member are disposed at a right angle to each other and the two transverse wheel forks are provided with equal effective lengths, and if, furthermore, the length of the extension of the lower transverse wheel fork is equal to the length of the lever arms of the deflecting guide member, then a change in the wheel camber is attained which is minor and which is symmetrical in both stroke directions of the springing.

However, if, with an otherwise identical construction and arrangement, the length of the extension of the lower transverse wheel fork is increased with respect to the length of the lever arms of the deflecting guide member, then a larger change in the camber during springing is obtained which is, however, likewise symmetrical with respect to the two directions of the spring stroke. In both above-mentioned embodiments of the present invention, the lever arm of the deflecting guide member cooperating with the upper transverse wheel fork is parallel with respect to the wheel plane when the camber angle is 0.

A change in camber which is asymmetrical with respect to the inward and outward stroke of the springing is attained in accordance with the present invention by disposing the lever arms of the deflecting guide member at a mutual angle of more than 90° in conjunction with dimensioning the effective lengths of the transverse wheel forks differently. In this case, the lever arm of the deflecting guide member cooperating with the upper transverse wheel fork is at an angle with respect to the wheel plane when the camber angle is zero. In all disclosed embodiments of the present invention, the pivot axes on the frame side of the deflecting guide member and the lower transverse wheel fork are disposed in the same vertical plane. Furthermore, a torsion-bar spring or torsion rod arranged in the longitudinal direction of the vehicle is suitably employed for wheel springing, which torsion-bar spring is disposed in the extension of the frame-side pivot axis of the lower transverse wheel fork and engages the latter in the zone of its pivot or hinged connection point in conventional manner.

The arrangement of a deflecting guide member at the pivot point of the upper transverse wheel fork permits a relative change in the length of the upper transverse wheel fork over the entire wheel stroke, whereby, in conjunction with the closed system, as a consequence of the joining of the deflecting guide member with the lower transverse wheel fork, any desired characteristic of the change in camber is positively attained over the entire wheel stroke. For example, by suitably designing a change in camber which is asymmetrical with respect to the inward and outward stroke of the springing, it is possible to keep the change in camber small in the positive direction and larger in the negative direction, thus attaining an improved lateral stability of the vehicle. By an appropriate camber characteristic, it is therefore possible to mitigate the negative consequences of a tendency of the car body to roll, which consequences reside essentially in a change in the wheel load distribution and in the wheel camber. Finally, another advantage worth mentioning is that a moment is produced which counteracts the tilting moment due to the connection of the transverse wheel forks at the lower pivot point of the frame.

BRIEF DESCRIPTION OF THE DRAWINGS

These and further features, advantages and objects of the present invention will become more apparent from the following description when taken in conjunction with the accompanying drawings which show, for purposes of illustration only, several embodiments in accordance with the present invention, and wherein.

DETAILED DESCRIPTION OF THE DRAWINGS

Figure 1:
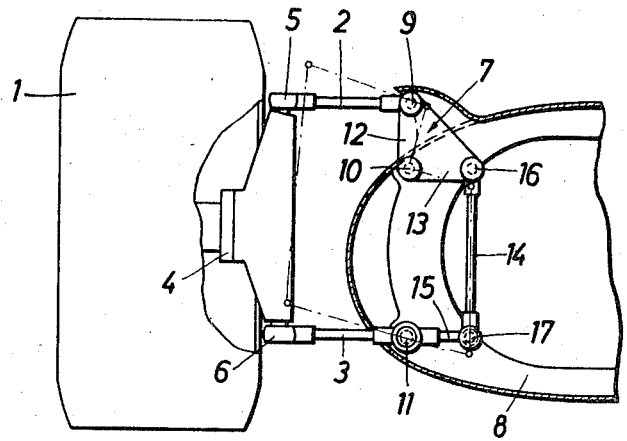
FIG. 1 is a view of the independent wheel suspension of the present invention for an automotive vehicle with a minor symmetrical change in camber.
Figure 2:
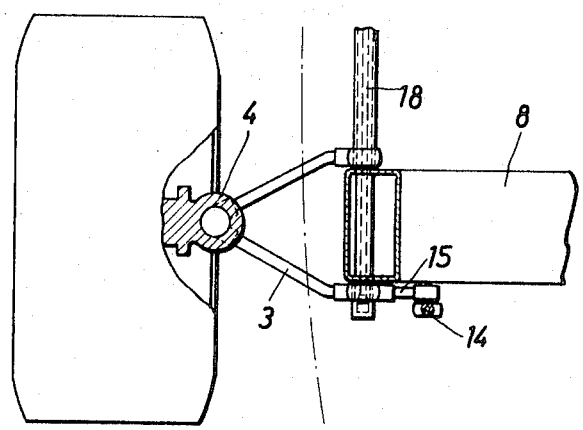
FIG. 2 is a partial sectional plan view of the independent wheel suspension according to FIG. 1.

Referring now to the drawings and, in particular, to FIG. 1, the wheel 1 of the independent wheel suspension according to the present invention is guided by way of an upper transverse wheel fork 2 and a lower transverse wheel fork 3, which are pivotably or hingedly connected to a wheel carrier 4 by means of links 5 and 6. The upper transverse or lateral wheel fork 2 is connected to the vehicle frame 8 by way of two-armed deflecting guide member 7, and the lower transverse wheel fork 3 is connected to the vehicle frame 8 directly. The upper transverse wheel fork 2 is pivotably or hingedly connected to the deflecting guide member 7 by means of link 9, and the guide member is pivotably or hingedly connected to the vehicle frame 8 by means of link 10. The lower transverse wheel fork 3 is hingedly connected to the vehicle frame 8 by means of link 11. The links 10 and 11 are disposed in the same vertical plane. The deflecting guide member 7 is constructed as a guide triangle and is provided with two equally long lever arms 12, 13, arranged at an angle with respect to each other. The upper transverse wheel fork 2 cooperates with the lever arm 12, and a link rod 14, acting as a tension member, cooperates with the lever arm 13. The link rod 14 is pivotably or hingedly connected with an extension 15 of the lower transverse wheel fork 3, which extension projects beyond the link 11 on the side of the frame. The link rod 14 is pivotably joined to the lever arm 13 of the deflecting guide member 7 by means of link 16, and to the extension 15 of the lower transverse wheel fork 3 by means of link 17.

In the illustrated embodiment, the effective lengths of the transverse wheel forks 2 and 3 are dimensioned so as to be of equal length, and the lever arms 12, 13 of the deflecting guide member 7 are disposed at a right angle with respect to each other. Furthermore, the length of the lever arms 12, 13 is equal to the length of the extension 15 of the lower transverse wheel fork 3. Thereby, in case of a camber angle of zero, the lever arm 12 of the deflecting guide member 7 cooperating with the upper transverse wheel fork 2 is parallel with respect to the wheel plane, so that the links 9, 10 and 11 are disposed in the same vertical plane.

It can be seen from the wheel positions shown in dot-dash lines in FIG. 1 that when the wheel is sprung inwardly, with a right-angle arrangement of the lever arms 12, 13 and equal length between the lever arm 13 and the extension 15, a change in camber of a minor extent is attained which is symmetrical in the inward and outward spring directions. A torsion-bar spring 18, which engages in the pivot axis 11 of the lower wheel fork 3 and extends in the longitudinal direction of the vehicle, serves for springing the wheel 1. Any other type of spring means can also be chosen for springing the wheel. With the construction and arrangement of the wheel suspension being essentially the same, it is also possible to obtain, if so desired, a larger change in camber by providing that the length of the extension 15 of the lower transverse wheel fork 3 is larger as compared to the lever arm 13 of the deflecting guide member 7.

Figure 3:
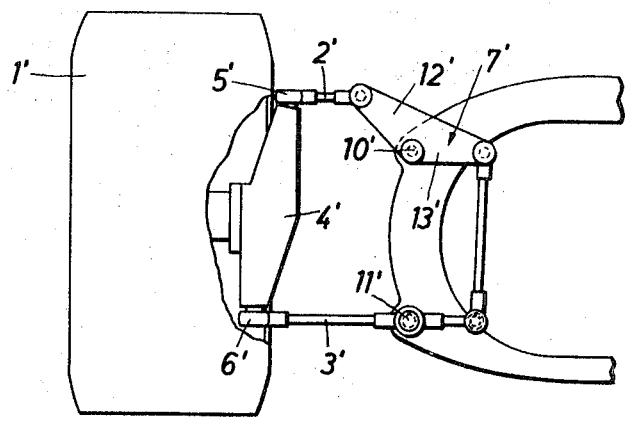
FIG. 3 is a view of another independent wheel suspension according to the present invention with an asymmetrical change in camber.

In contrast to the above-described embodiments, a change in camber which is asymmetrical in the outward and inward springing directions is obtained in an arrangement shown in FIG. 3. The same parts are designated with the same reference numerals, which are primed. The transverse wheel forks 2' and 3' have differing effective lengths and are pivotably or hingedly connected to the wheel carrier 4' by means of links 5' and 6'. Furthermore, lever arms 12' and 13' of the deflecting guide member 7' are disposed at a mutual angle of more than 90° In the embodiment of FIG. 3, the lever arm 12' of the deflecting guide member 7' cooperates with the upper transverse wheel fork 2' and is disposed at an angle with respect to the wheel plane when the camber angle is 0, so that only the links 10' and 11' are in a common vertical plane. When the wheel 1' springs inwardly, a larger change in camber is thus attained than when it springs outwardly.

With the aid of the above-described measures, any desired influence can be exerted on the path of motion of the links 5, 5', so that by the individual or combined application of the above-disclosed measures, it is positively possible to effect practically any desired camber characteristic. The distribution of forces within the independent wheel suspension of the present invention, when a lateral guide force occurs at the tire, is described hereinbelow. By the lateral guide force, a tilting movement is produced about the link 6 of the lower transverse wheel fork 3 at the side of the wheel, which tilting moment appears at the upper transverse wheel fork 2 as a tractive force. By the deflection of the tractive force by means of the deflecting guide member 7 and the tie rod 14, a moment is produced, with the lever arm of the extension 15 of the lower transverse wheel fork 3, about the link 11 of the lower transverse wheel fork 3 on the side of the frame, which moment counteracts the tilting moment.

While I have shown and described several embodiments in accordance with the present invention, it is to be understood that the same is susceptible of numerous changes and modifications as will be apparent to a person having ordinary skill in the art, and I, therefore, do not wish to be limited to the details shown and described herein but intend to cover all such changes and modifications which are encompassed by the scope of the present invention.

I claim:

1. Independent wheel suspension for vehicle comprising a wheel being guided by upper and lower transverse wheel fork means mounted at the vehicle frame so as to be pivotable about approximately horizontal axes, said lower transverse wheel fork means being directly operatively connected at the vehicle frame, and a two-armed deflecting guide member being operatively connected at said upper transverse wheel fork means and at the vehicle frame, and wherein said deflecting guide member has a first lever arm operatively connected with an extension of said lower transverse wheel fork means, said extension extending beyond the direct connection of said lower transverse wheel fork means at the vehicle frame.

2. Independent wheel suspension according to claim 1, wherein the operative connection of said first lever arm and said extension includes link rod means.

3. Independent wheel suspension according to claim 1, wherein said deflecting guide member includes a second lever arm being of substantially the same length as said first lever arm and disposed at an angle thereto.

4. Independent wheel suspension according to claim 3, wherein the operative connection of said first lever arm and said extension includes link rod means.

5. Independent wheel suspension according to claim 1, wherein said deflecting guide member includes a second lever arm disposed substantially perpendicular to said first lever arm.

6. Independent wheel suspension according to claim 5, wherein said upper and lower wheel fork means have substantially equal effective lengths, and the operative connection of said first lever arm and said extension includes link rod means.

7. Independent wheel suspension according to claim 6, wherein said first lever arm and said second lever arm have substantially equal lengths.

8. Independent wheel suspension according to claim 1, wherein said deflecting guide member includes a second lever arm disposed at an angle with respect to said first lever arm, and wherein said extension has substantially the same length as said first and second lever arms.

9. Independent wheel suspension according to claim 8, wherein the operative connection of said first lever arm and said extension includes link rod means.

10. Independent wheel suspension according to claim 9, wherein the angle between said first lever arm and said second lever arm is substantially 90°.

11. Independent wheel suspension according to claim 10, wherein said upper and lower wheel fork means have substantially equal effective lengths.

12. Independent wheel suspension according to claim 1, wherein said deflecting guide member includes a second lever arm disposed at an angle with respect to said first lever arm, and wherein said extension has a greater length than said first and second lever arms.

13. Independent wheel suspension according to claim 12, wherein the operative connection of said first lever arm and said extension includes link rod means.

14. Independent wheel suspension according to claim 13, wherein said first lever arm and said second lever arm are of substantially equal length.

15. Independent wheel suspension according to claim 14, wherein the angle between said first lever arm and said second lever arm is substantially 90°, and said upper and lower wheel fork means have substantially equal effective lengths.

16. Independent wheel suspension according to claim 1, wherein said deflecting guide member includes a second lever arm disposed at an angle of more than 90° with respect to said free lever arm, and said upper and lower transverse wheel forks having different effective lengths.

17. Independent wheel suspension according to claim 16, wherein the operative connection of said first lever arm and said extension includes link rod means.

18. Independent wheel suspension according to claim 17, wherein said first and second lever arms have substantially equal lengths.

19. Independent wheel suspension according to claim 2, wherein the connection points of said deflecting guide member and said lower transverse wheel fork means at the vehicle frame are disposed substantially in the same vertical plane.

20. Independent wheel suspension according to claim 19, wherein said deflecting guide member includes a second lever arm being of substantially the same length as said first lever arm and disposed at substantially a right angle thereto.

21. Independent wheel suspension according to claim 20, wherein said upper and lower transverse wheel fork means have substantially equal effective lengths, and said extension having substantially the same length as said first lever arm and said second lever arm.

22. Independent wheel suspension according to claim 19, wherein said deflecting guide member includes a second lever arm disposed at an angle with respect to said first lever arm, and wherein said extension has a greater length than said first and second lever arms.

23. Independent wheel suspension according to claim 19, wherein said deflecting guide member includes a second lever arm disposed at an angle of more than 90° with respect to said free lever arm, and said upper and lower transverse wheel forks having different effective lengths.

24. Independent wheel suspension according to claim 2, wherein a torsion bar spring means is operatively associated with said lower transverse wheel fork means and aligned with the pivot connection point of said lower transverse wheel fork means at the vehicle frame so as to cooperate therewith.

25. Independent wheel suspension according to claim 14, wherein said deflecting guide member includes a second lever arm being of substantially the same length as said first lever arm and disposed at an angle thereto.

26. Independent wheel suspension according to claim 25, wherein the angle between said first lever arm and said second lever arm is substantially 90°, and said upper and lower wheel fork means have substantially equal effective lengths.

27. Independent wheel suspension according to claim 24, wherein said deflecting guide member includes a second lever arm disposed at an angle with respect to said wherein first lever arm, and said extension has a greater length than said first and second lever arms.

28. Independent wheel suspension according to claim 24, wherein said deflecting guide member includes a second lever arm disposed at an angle of more than 90° with respect to said free lever arm, and said upper and lower transverse wheel forks having different effective lengths.

29. An independent wheel suspension for vehicles comprising a vehicle frame, a wheel, upper and lower transverse wheel fork means connected to said wheel for guiding said wheel, a two-armed deflecting guide member pivotally connected to said frame, said lower fork means being pivotally connected to said frame, said upper fork means being pivotally connected to a first arm of said deflecting guide member, said lower fork means having an extension extending inwardly on the frame beyond the pivotal connection with the frame, said extension being pivotally connected to the bottom end of a link rod, the top end of said link rod being pivotally connected to a second arm of said deflecting guide member, and wherein all of said pivotal connections have substantially horizontal pivot axes.

30. An independent wheel suspension according to claim 29, wherein said first and second arms are disposed at right angles with one another and wherein the upper and lower fork means have substantially equal effective lengths between their respective connections to the guide member and the frame.

31. An independent wheel suspension according to claim 29, wherein said first and second arms are disposed at an obtuse angle with one another and wherein the upper fork means has an effective length between the wheel and its connection with the guide member that is shorter than the effective length of the lower fork means between the wheel and the frame.

* * * * *